June 1, 1937. H. W. OLSEN 2,082,650
AUTOMOBILE TIRE PRESSURE INDICATING SYSTEM
Filed May 26, 1932 2 Sheets-Sheet 1
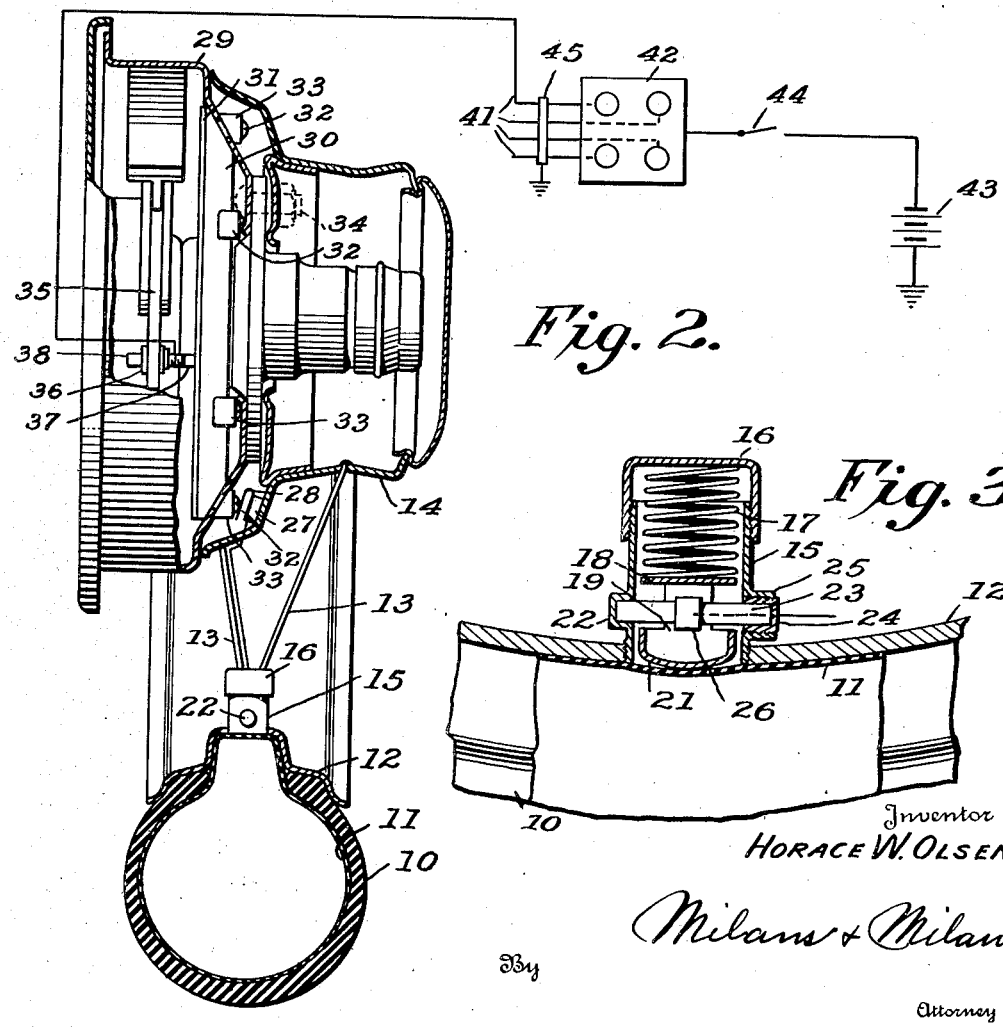
Inventor
HORACE W. OLSEN.
By Milans & Milans
Attorney

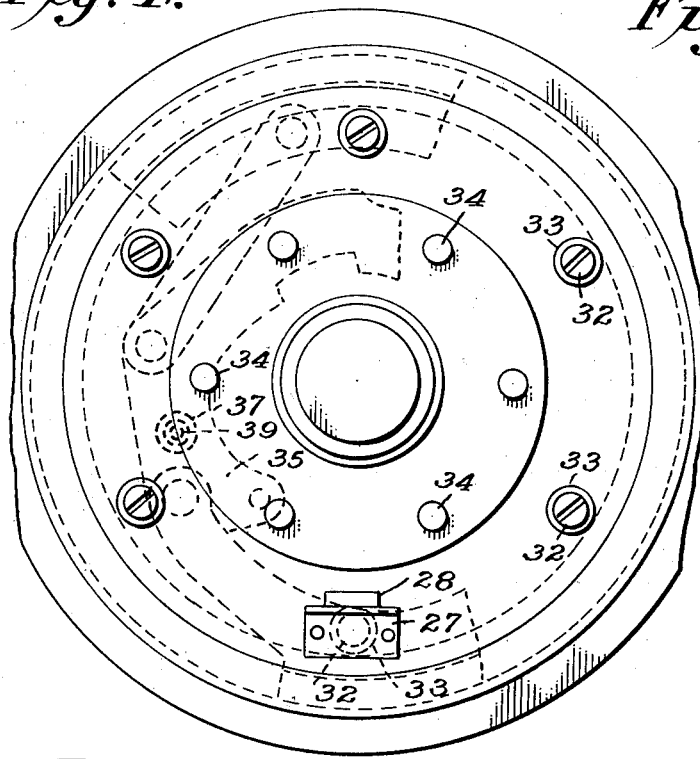
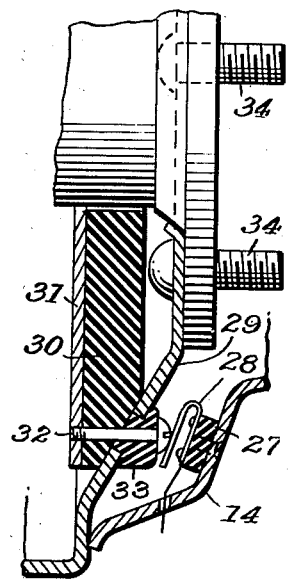
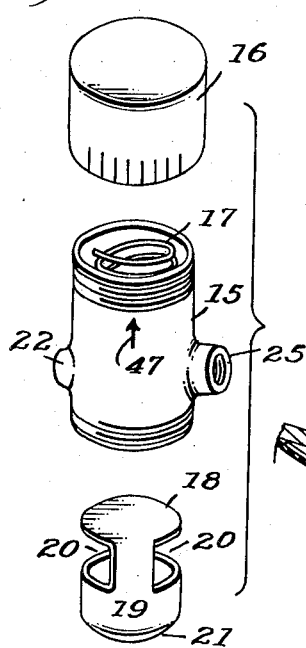
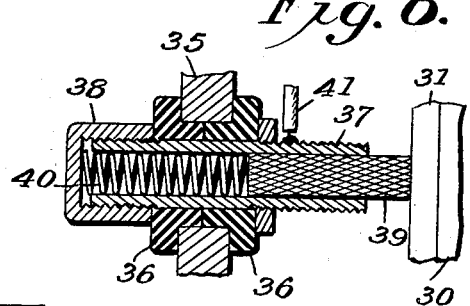
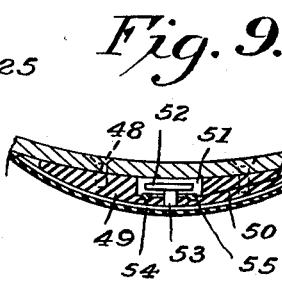
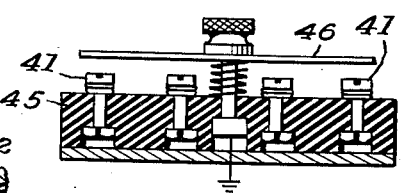
Inventor
HORACE W. OLSEN.

Patented June 1, 1937

2,082,650

UNITED STATES PATENT OFFICE 2,082,650

AUTOMOBILE TIRE PRESSURE INDICATING SYSTEM

Horace W. Olsen, Austin, Tex., assignor of twenty per cent to Robert Hulen Lawrence, Austin, Tex., and forty per cent to James L. De Vault, Ocheltree, Kans., and George S. Hinkle, Kilgore, Tex.

Application May 26, 1932, Serial No. 613,756

7 Claims. (Cl. 173—324)

This invention relates to certain new and useful improvements in an automobile tire pressure indicating system which is associated with the respective tires on the vehicle so as to enable the operator, even while the vehicle is in motion, to ascertain at a glance a low or undesired underpressure of any of the respective vehicle tires.

In all modern automobiles, the wheels are of the demountable type, and it is the main object of the present invention to associate a tire signalling device with such wheels.

A further object resides in the provision of a signalling device which is so constructed and connected to the respective parts that no special attention need be directed to a given set position of the demountable wheel outside of registering said wheel with the usual hub receiving lugs or bolts.

Another object of the present invention resides in the novel and efficient manner of housing or enclosing the various mechanisms to protect said parts from dust, dirt, moisture, etc.

These and other objects will readily present themselves to those skilled in this particular art, when the following specification is read in connection with the attached drawings wherein I have illustrated the preferred embodiment of my invention. It will be further understood that certain variations or changes may be resorted to without departing from the spirit of the disclosed invention, and the scope of protection contemplated will appear from the appended claims.

In the drawings—

Figure 1 is a diagrammatic view illustrating an automobile in side elevation with electrical connections leading from the front and rear wheels to the instrument board of the machine;

Figure 2 is an enlarged cross sectional view of a portion of one of the wheels illustrating more clearly the necessary electrical connections that are made in the hub portion of the wheel and then connected to the annunciator and the battery;

Figure 3 is a longitudinal cross section of a portion of the wheel frame or felly showing the pressure responsive element mounted in position thereon;

Figure 4 is an enlarged side view of the brake drum showing the series of contacts concentrically arranged thereon and with any one of which the single demountable wheel contact may be brought into registration. This view also shows in dotted outline a portion of the brake band mechanism, and the stationary part of which structure acts as a support for the brush member;

Figure 5 is an enlarged cross sectional view of a portion of the wheel structure showing the demountable wheel contact in engagement with one of the brake drum contacts and also illustrating more clearly the mounting of the steel ring or plate on the interior of the brake drum housing;

Figure 6 is an enlarged view in section showing the manner of mounting the brush member within the stationary part of the brake band mechanism with the brush portion in spring urged contact with the rotating steel ring or plate which is carried by the brake drum;

Figure 7 is a disassembled perspective view of the cap, shell, spring and plunger which constitute the pressure responsive element that is affixed to the felly of the wheel;

Figure 8 is a cross sectional view of a ground switch which may be used for testing purposes; and Figure 9 is a modified form of the pressure responsive element.

In the attached drawings wherein similar letters of reference indicate like parts throughout the several views, 10 is the usual tire casing having the inflated inner tube 11 mounted therein, which structure is carried on the standard felly or rim 12. The wheel is provided with spokes 13 extending between the felly or rim 12 and the hub portion 14. All of this structure is of the usual standard form and no claim thereto is made in the present case.

Secured to the rim or felly 12, preferably by a threaded connection, is a casing or cylinder 15 having a screw threaded cap 16 over the upper end thereof and against which an expansible spring 17 bears. The lower end of the spring 17 bears against a cap 18 of a plunger member designated by the reference character 19. This plunger member is of a shell formation, cut away at the opposite sides, as indicated at 20—20, and having a rounded or slightly curved bearing face 21. The face 21 is adapted to bear against the wall of the inflated inner tube 11, as is clearly shown in Figure 2. The cylindrical wall of the casing 15 is slightly bulged as at 22 to form a seat or support for the end of a transversely arranged plug or block of insulating material 23, the opposite end of the plug being mounted within a cap 24, which in turn is screw threaded into the bore 25 located at the opposite side of the cylinder 15. This transverse block 23 extends through the cut away portions 20—20 of the plunger 19 and carries a contact plug or gear 26 which is medially positioned beneath the cap 18.

Within the hub portion 14 is secured a block of insulating material designated 27 and upon this block is mounted a spring member 28. Suitable electrical connection is made between the spring member 28 and the contact plug 26 of the pressure responsive member, by leading a wire from said plug through the block 23, then along one of the wheel spokes to the spring member 28.

Arranged within the brake band housing, which is designated by the reference character 29, is an insulating block or ring 30 on the face of which is secured a steel ring 31. This combined block and ring is secured in position by suitable bolts or screws 32 which are in turn insulated from metallic contact with the adjacent parts by the insulating fillers 33. As clearly shown in the drawings, particularly Figure 4, there are six of these fastening bolts or screws, concentrically arranged and spaced equi-distant in relation to the wheel fastening lugs or bolts 34. It will, therefore, be appreciated that no particular attention need be given to the replacement of the demountable wheel for making the necessary electrical connection so long as the fastening bolts 34 are brought into registration with the bolt openings in the hub portion of the wheel. While I have designated in the present case six wheel fastening lugs or bolts, it will be understood that more or less may be used, and in such cases an equal number of contact screws or members will be employed. The whole thought here is to positively assure proper electrical contact regardless of the applied position of the wheel.

Within the brake band housing are the usual brake bands and operating mechanism and to one of the stationary portions of this mechanism is secured a brush or take-off structure. This is more clearly illustrated in Figure 6 of the drawings wherein 35 designates a stationary part of the brake mechanism having insulating sleeves or bushings 36—36 secured thereto and through which a threaded tube 37 extends. Over one end of the tube 37 is a screw threaded cap 38 and slidably fitted within the opposite end of said tube is a metallic brush or take-off member 39. This brush may be of any suitable formation, but is preferably of the rolled gauze type. In order to compensate for wear on the brush 39, an expansible spring 40 is employed, which spring bears at one end against the inner surface of the cap 38, and at the opposite end against the rear end of the brush 39. Electrical connection 41 is made with any metallic portion of the brush element, but preferably to the exposed portion of the tube that is located on the outside of the brake mechanism.

All of the four wheels being equipped and connected as above described, the individual wires 41 are led to an annunciator 42 which is located on the instrument board of the machine. Suitable connection is also made to the battery 43 and controlled by switch 44. This switch may be of any standard construction, but is preferably controlled by the operation of the ignition switch of the machine. Also, if desirable, a grounding or testing switch 45 may be used and inserted in the system, merely as an illustration, as shown in Figure 8, a normally spring supported plate or bar 46 overlies the exposed portions of the conducting wires 41, and upon downward pressure said plate grounds all of said wires so that a test may be made on the individual light bulbs within the annunciator.

In order to vary the set of the pressure responsive member to meet the various demands upon the individual users, the cap 16 is suitably marked to indicate pounds pressure in accordance with the rotated position of said cap which increases or decreases the pressure exerted on the enclosed spring 17. The cylinder 15 is marked as at 47 to indicate the setting of the cap 16.

Figure 9 illustrates a modification of the pressure responsive element which may be given a definite set position at the factory so as to operate at a predetermined pound pressure. Within the felly 12 there is secured by screws 48 a block of insulating material 49 having an arcuate face 50. The block is recessed as at 51 to receive an enlarged head 52, to the central portion of which a stem 53 is secured. The outer end of the stem is fastened to the central portion of a bowed spring member 54 which is normally restrained from movement by the implied pressure of the inner tube against which it rests. In the base of the recess 51 is a ring member 55 which is electrically connected to the single contact spring member 28 carried by each wheel. The bowed spring member may take the form of a spring diaphragm, in fact, any relatively flat yieldable body may be used if desired. In this structure it will be noted that the pressure responsive element is completely housed within the tire structure, thereby protecting said parts from being affected by dust, dirt, moisture, etc. Also, as intimated above, this structure is incorporated within the wheel at the time of its assemblage at the factory, and, as stated, is set to operate at a definite pound pressure, thereby obviating any further attention on the part of the subsequent users.

What I desire to claim by U. S. Letters Patent is:

1. A current conducting assemblage comprising in combination, a series of uniformly spaced contacts arranged on a retained portion of a hub structure, a connection between the contacts, and a demountable wheel adapted to be mounted on the hub in any of several positions and having a single contact element adapted to be brought into registration with one of the hub contacts in any of the applied positions of said wheel.

2. A current conducting assemblage comprising in combination, a series of equi-distantly spaced contacts arranged on a retained portion of a hub structure, a connection between the contacts, a series of equi-distantly spaced securing lugs carried by the hub structure, and a demountable wheel having a series of equi-distantly spaced apertures for the reception of said securing lugs, said wheel being provided with a single contact element adapted to be brought into registration with one of the hub contacts in any of the applied positions of the wheel.

3. A current conducting assemblage comprising in combination, a series of concentrically and equi-distantly spaced contacts arranged on a retained portion of a hub structure, a connection between the contacts, a series of concentrically and equi-distantly spaced securing lugs carried by the hub structure, and a demountable wheel having a series of concentrically and equi-distantly spaced apertures for the reception of said securing lugs, said wheel being provided with a single contact element adapted to be brought into registration with one of the hub contacts in any of the applied positions of the wheel.

4. A current conducting assemblage comprising in combination, a plurality of equi-distantly spaced contacts arranged on a retained portion of a hub structure, a collector ring within the hub structure adapted to interconnect said spaced contacts, and a brush bearing against said ring; said hub being further provided with equi-distantly spaced wheel securing lugs and a demountable wheel provided with equi-distantly spaced apertures for the reception of said securing lugs, and said wheel being further provided with a single contact element adapted to register with one of the hub contacts in any of the applied positions of said wheel.

5. A current conducting assemblage comprising in combination, a hub portion having a series of equi-distantly spaced wheel fastening bolts and a plurality of contacts uniformly spaced with respect to said bolts, a ring connection between said contacts, a brush in contact with said ring, and a demountable wheel provided with a series of equi-distantly spaced bolt receiving apertures and having a single contact element adapted to be brought into registration with one of the hub contacts in any of the applied positions of said wheel on said hub portion.

6. In a current conducting assemblage comprising in combination, a hub portion having a series of equi-distantly spaced wheel fastening bolts and a plurality of contacts uniformly spaced with respect to said bolts, a connection between said contacts, and a demountable wheel provided with a series of equi-distantly spaced bolt receiving apertures and further provided with a single contact adapted to be brought into registration with one of the hub contacts in any of the applied positions of said wheel on said hub portion.

7. In a current conducting assemblage comprising in combination, a hub portion, a wheel adapted to be mounted on the hub portion in any of several set positions, and cooperating means consisting of a plurality of spaced contacts carried by the hub portion, a connection between the contacts, and a single contact carried by the wheel to establish current connection between said parts in any of the applied positions of said wheel on said hub portion.

HORACE W. OLSEN.